Aug. 22, 1944.  J. J. SILECK  2,356,708
BUS CONSTRUCTION
Filed Oct. 6, 1941   2 Sheets-Sheet 1
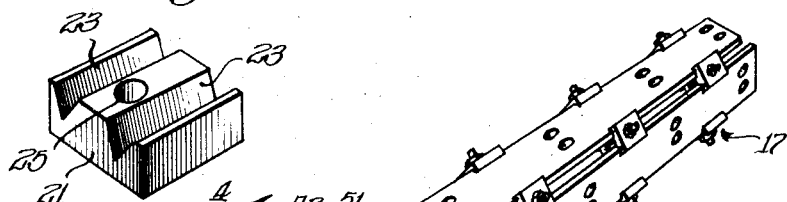
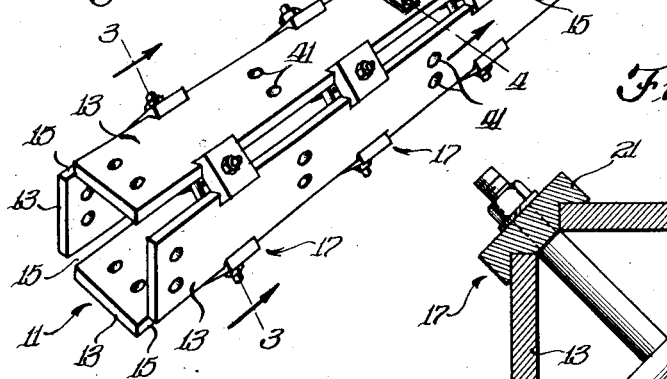
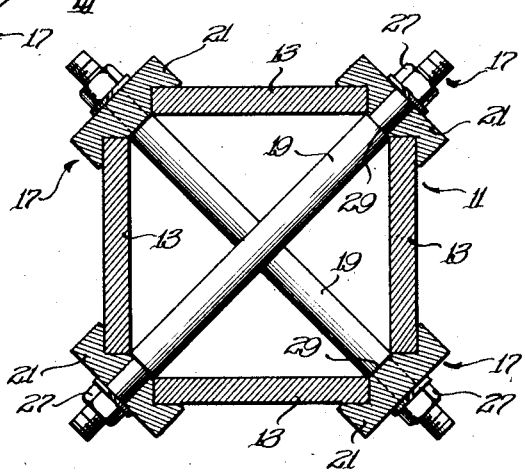
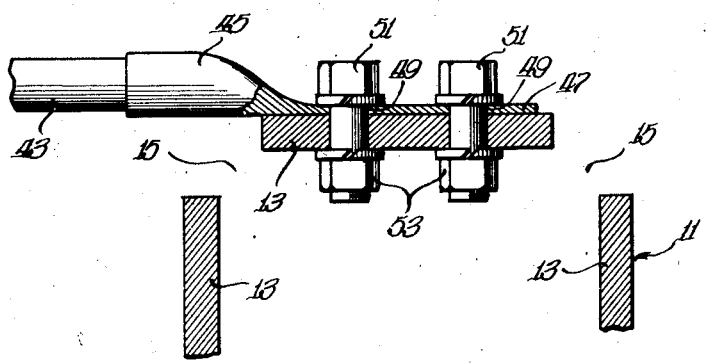
INVENTOR:
Joseph J. Sileck
BY: Spencer, Marzall, Johnston & Cook
ATTORNEYS Aug. 22, 1944. J. J. SILECK 2,356,708
BUS CONSTRUCTION
Filed Oct. 6, 1941 2 Sheets-Sheet 2

INVENTOR:
Joseph J. Sileck
BY Spencer, Marzall, Johnston & Cook.
ATTORNEYS.

Patented Aug. 22, 1944

2,356,708

UNITED STATES PATENT OFFICE 2,356,708

BUS CONSTRUCTION

Joseph J. Sileck, Chicago, Ill.

Application October 6, 1941, Serial No. 413,794

4 Claims. (Cl. 174—129)

My invention relates in general to the transmission and distribution of electrical power and has more particular reference to an improved bus structure for use in electrical power distributing systems.

An important object of the present invention is to provide a simple, inexpensive, yet mechanically rugged structure comprising an electrical power bus; a further object being to provide a bus structure comprising conductor elements of simple, standard configuration structurally bound together by clamping means comprising a minimum number of parts of simple, standard form.

Another important object is to provide a bus structure comprising a plurality of conductor elements secured together and electrically connected in spaced relationship to afford adequate ventilation therebetween for the dissipation of heat generated in the conductor elements when in service for the distribution of electrical power therethrough; a further object being to utilize relatively thin elongated bars of plate-like configuration as conductor elements in the bus structure and to mount the same for the passage of a cooling fluid therebetween, whereby the conductors may be electrically loaded to maximum capacity without dangerously overheating the same; a still further object being to secure the bars in adjacent parallel relationship in position forming an elongated tube or box having slot-like openings between adjacent edges of adjacent conductors, which openings afford vents extending longitudinally of the tubular bus structure for ventilation purposes.

Another important object resides in providing improved clamp means comprising a minimum number of parts of simple form adapted for fabrication as standard elements on automatic forming machines; a further object being to provide clamp means comprising members positioned in the structure between the spaced edges of adjacent conductors and arranged to exert an equal clamping force on each of the adjacent members; a still further object being to arrange the tension members in the radial plane extending from the geometric center line of the tubular bus structure and bisecting the space between adjacent edges of adjacent conductors.

Another important object is to provide clamping means for the conductors of the tubular bus structure comprising a clamp rod adapted to extend between adjacent edges of adjacent conductors and radially with respect to the geometric center of the structure, and a co-operating clamp plate adapted to be mounted on the clamp rod at said adjacent conductor edges and being formed with spaced grooves for the reception of said conductor edges on opposite sides of the clamp rod whereby each rod may apply its clamping force equally to both conductors secured by the clamping plate.

The foregoing and numerous other important objects, advantages and inherent functions of the invention will become apparent as the same is more fully understood from the following description which, taken in connection with the accompanying drawings, reveals preferred embodiments of the invention.

Referring to the drawings:

Figure 1 is a perspective view of a bus structure, comprising four conductor members, embodying my present invention;

Figure 2 is a perspective view of a clamp member forming a part of the structure shown in Figure 1;

Figure 3 is a sectional view taken substantially along the line 3—3 in Figure 1;

Figure 4 is a sectional view taken substantially along the line 4—4 in Figure 1;

Figure 5:
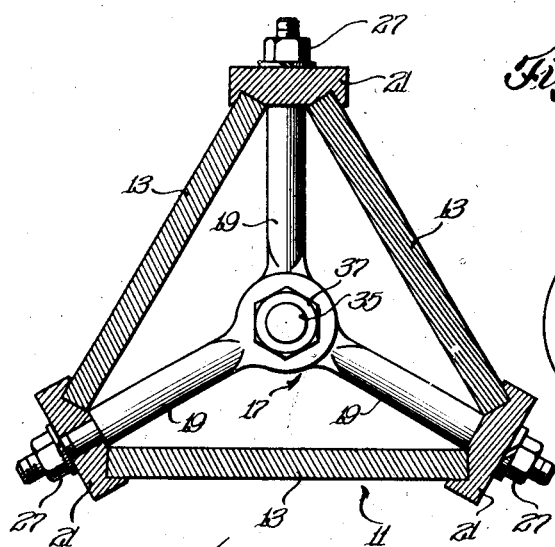
Figure 5 is a sectional view corresponding with Figure 3 and illustrating the invention as embodied in a bus structure comprising three conductor elements.

To illustrate the invention, I have shown on the drawings a bus structure 11 comprising a plurality of elongated plate-like conductor elements 13 assembled to form a hollow, tubular beam or bus with the adjacent edges of adjacent members spaced apart to form slot-like openings 15 longitudinally of the hollow bus. The members 15 preferably comprise elongated bars of suitable electrical conducting material having rectangular sectional configuration, and the bars are preferably flat members, although, if desired, they may be curved, in which event the hollow bus structure may have a generally cylindrical shape. The members 13 in a bus structure also are preferably of identical shape and are therefore well adapted for mass production by suitable forming machines.

A bus structure made in accordance with my present invention may comprise three or more conductor elements and may have circular, triangular, or other polylateral sectional configuration, although the preferable, and ordinarily most useful, structure comprises the rectangular box structure shown in Figures 1 and 3.

In accordance with my invention, the conductor elements 13 are secured together in spaced relationship, forming a hollow tube structure, by clamping means 17 disposed at intervals in the structure, said clamping means comprising tensioning rods 19 and clamping plates 21. The rods 19, in accordance with my invention, are adapted for assembly in the bus structure in position extending radially with respect to the geometric center of the structure, the rods having ends adapted to extend between the spaced-apart adjacent edges of the conductor elements 13, said ends being formed to receive each a clamping plate 21. The clamping plates 21 preferably comprise plates of electrical conducting material, the plates preferably being of rectangular configuration and formed each with spaced grooves 23 at the opposite edges thereof and an opening 25 through the plate between the grooves 23. The opening 25 is positioned to receive an end of a rod 19 in position at the edges of a pair of adjacent conductors 13, and to receive said edges in the grooves 23 on opposite sides of the rod 19. In the embodiments herein illustrated, the edges of the conductors 13 are rectangular and the grooves 23 are of rectangular shape comprising surfaces intersecting at right angles to receive each a corner of a member 13.

The extreme end of the rod 19 which projects through the opening 25 and outwardly of the clamp plate 21 is threaded for the reception of a clamping nut 27 for the purpose of drawing the clamp plate 21 inwardly upon the rod 19, thereby to exert a clamping force upon the edges of the members 13 received in the grooves 23. The rod may be provided with a shoulder 29 to limit the clamping movement of the clamping plate 21 on the rod. As shown in Figures 1 and 3, illustrating a square box-like bus structure, the clamp rods 19 are identical, extend diagonally between the opposite corners of the structure, and are formed at opposite ends to receive clamp plates 21 so that each rod functions to secure the diagonally opposite corners of the box-like structure, a pair of adjacent rods together securing all of the corners of the structure. The grooves 23 where the bus structure is square are formed in the plates 21 with the intersecting forming groove surfaces extending in planes making 45° angles with the axis of the opening 25, this arrangement insuring that each clamp plate 21 exerts like clamping effect upon each of the conductors secured by the plate.

Figure 6:
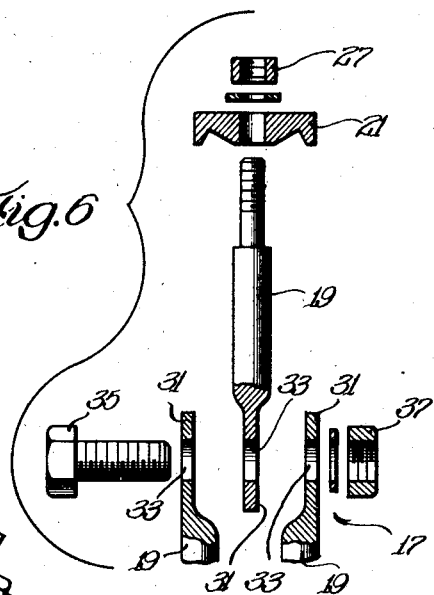
Figure 6 is an exploded assembly view of clamping means employed in the structure shown in Figure 5.
Figure 7:
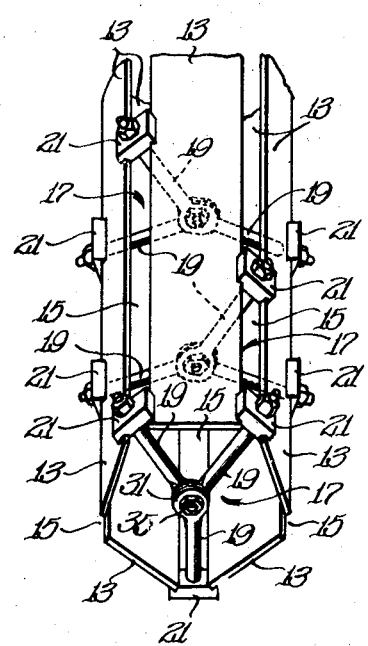
Figure 7 is a perspective view illustrating the application of the clamping structure of the sort shown in Figure 6 in a bus structure embodying five conductors.
Figure 8:
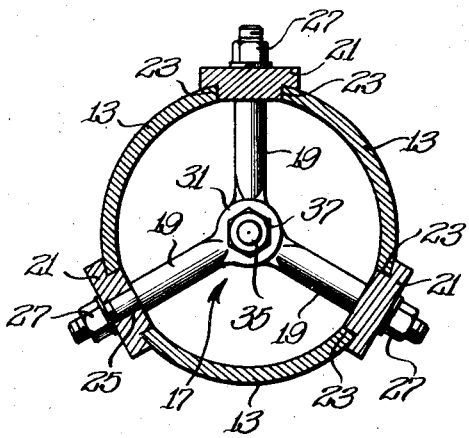
Figure 8 is a sectional view similar to Figures 3 and 5, showing how the invention may be applied in the formation of a hollow cylindrical bus structure.

As shown in Figures 5–8, the clamping means may comprise members 19, formed at one end for the reception of clamp plates 21 and clamping nuts 27, and formed at the other end with lugs 31 having perforations 33 for the reception of a bolt 35 which, in combination with a co-operating nut 37, is adapted to secure the lugs 31 together on the bolt 35. The rod arrangement shown in Figure 6 is adapted for use in any bus structure embodying the present invention but is more particularly adapted for use in structures comprising an uneven number of conductors 13. In Figures 5 and 8, the clamping structure is shown as applied in a bus structure comprising three conductor members 13. Figure 7 shows the application of the clamp means in a structure embodying five conductor members 13.

In the embodiment illustrated in Figure 5, the grooves of the clamp plate 21 are formed by intersecting groove defining surfaces, respectively making a 30° and a 60° angle with respect to the axis of the opening 25 so that, when assembled in a triangular structure, the rods 19 may exert an equal clamping effect upon the edges of both conductor members clamped thereby. A corresponding angular relationship preferably exists in the grooves of the clamp members used in the embodiment shown in Figure 7. In this embodiment, the clamp assembly, comprising three rods, may be used in a five-sided bus structure by assembling the clamp in position progressively rotated with respect to the structure. In such an assembly, each clamp secures the adjacent edges of adjacent conductors forming three of the five openings 15, but adjacent clamp assemblies secure the conductor members 13 at edges including edges other than those secured by the other clamp assemblies in the bus structure. In each case, however, the members 19 each exert substantially equal clamping effect upon the edges of adjacent conductors 13 secured thereby.

As shown in Figure 8, the clamp plates 21 are formed to receive the facing edges of adjacent arcuately curved conductor elements 13. In the embodiment shown in Figure 8, however, each rod 19 of the clamp means exerts a substantially equal clamping effect upon the adjacent pair of conductors clamped thereby.

The conductor elements 13 may be formed at intervals with openings 41 for the reception of fastening elements, such as bolts, for the attachment of the bus assembly on suitable bus supporting means, such as insulated pedestals; and the openings 41 also afford means for the attachment on the bus of lead taps which, as shown in Figures 2 and 4, may comprise suitable conductor means 43 provided with a terminal 45 comprising a flange 47 formed with openings 49 in position to register with a pair of the openings 41, whereby fastening bolts 51 and co-operating nuts 53 may be utilized for securing and electrically connecting the tap conductor 43 with the bus structure. In this connection, it will be noted that the openings 15 give access to the inner faces of the conductor members 13 so that a wrench or other instrument may be introduced through an opening 15 for the purpose of manipulating the nuts 53 in mounting or dismounting the tap conductor.

The bus structure of my present invention is of extremely simple design and is adapted for production and assembly at low cost, not only for the parts involved, but also for labor in assembling the structure. The structure may be utilized to advantage either in air cooled or oil immersed installations wherever bus structure is needed, and the structure of my present invention affords maximum current carrying capacity per unit of overall weight involved, since the cooling effect afforded by the hollow vented arrangement herein described allows adequate circulation of a cooling fluid, be it air or oil, thereby allowing maximum loading.

It is thought that the invention and its numerous attendant advantages will be fully understood from the foregoing description, and it is obvious that numerous changes may be made in the form, construction, and arrangement of the several parts without departing from the spirit and scope of the invention, or sacrificing any of its attendant advantages, the forms herein described being preferred embodiments for the purpose of illustrating the invention.

The invention is hereby claimed as follows:

1. An electrical bus structure comprising elongated strips forming conductor members disposed about a central axis in position forming the sides of a hollow tubular bus, the adjacent edges of adjacent conductor members being spaced to provide openings extending longitudinally of the bus, clamping means comprising clamp rods extending radially of said central axis, said rods having ends interconnected at said axis and each having a portion extending in a said opening between adjacent edges of a pair of conductor members, and a clamping shoe on each rod in position engaging the adjacent edges of the pair of conductor members between which the rod extends.

2. An electrical bus structure comprising a plurality of elongated flat strips forming conductor members disposed in position providing the side walls of a hollow tubular bus having an odd number of side walls, the adjacent edges of adjacent conductor members being spaced to provide openings extending longitudinally of the bus, clamping means comprising at least three clamp rods having ends interconnected on a common pivot within the hollow bus, each of said rods extending from said pivot in one of said openings between adjacent edges of a pair of conductor members, and a clamping shoe on each rod and formed with oppositely inclined seats in position to receive the adjacent edges of the pair of strips between which the rod extends.

3. An electrical bus structure comprising a plurality of three strips forming conductor members disposed in position providing the three side walls of a hollow tubular bus having openings extending longitudinally of the bus between adjacent side edges of adjacent strips, clamping means securing said members in position, said clamping means comprising three clamp rods having ends interconnected on a common pivot within the hollow bus, each of said rods extending from said pivot in one of said openings between adjacent edges of a pair of conductor members, and a clamp shoe on each rod and formed with oppositely facing seats in position to receive the adjacent edges of a pair of strips between which the rod extends.

4. An electrical bus structure comprising three strips forming conductor members of arcuate sectional configuration disposed in position providing the three side walls of a hollow cylindrical bus having openings extending longitudinally of the bus between adjacent edges of adjacent strips, clamping means securing said members in position, said clamping means comprising three clamp rods having ends interconnected on a common pivot within the hollow bus, each of said rods extending from said pivot in one of said openings between adjacent edges of a pair of conductor members, and a clamp shoe on each rod and formed with oppositely facing seats in position to receive the facing edges of the pair of adjacent strips between which the rod extends.

JOSEPH J. SILECK.